Patented Apr. 23, 1940

2,197,953

UNITED STATES PATENT OFFICE 2,197,953

PROCESS FOR MAKING ANHYDRITE

Roy William Sullivan, Cragmere, Del., assignor to E. I. du Pont de Nemours & Company, Wilmington, Del., a corporation of Delaware No Drawing. Application December 2, 1937, Serial No. 177,739

6 Claims. (Cl. 23—122)

The present invention relates to a process for the production of calcium sulfate anhydrite of high pigment quality and extremely fine particle size particularly useful as a pigment or pigment extender. More particularly it relates to a process for making a colloidal form of calcium sulfate which is a very active seed material and which is useful for converting hydrated forms of calcium sulfate into the insoluble variety of extremely fine particle size.

Calcium sulfate containing different amounts of water of crystallization has been prepared in the prior art by combining milk of lime with sulfuric acid. In general, the dihydrate is prepared from relatively dilute solutions while the forms containing lower amounts of combined water of crystallization viz., hemihydrate and soluble anhydrite, are prepared under what may be considered dehydrating conditions, as for example, in sulfuric acid of relatively high concentration. It is furthermore known in the prior art that gypsum ($CaSO_4.2H_2O$) can be dehydrated in the presence of sulfuric acid of 1.3 to 1.8 specific gravity at elevated temperature. Such a process is disclosed in U. S. Patent 2,021,910. However, under the above conditions the calcium sulfate is converted into the insoluble variety and its particle size is not sufficiently small enough to meet the requirements of a desirable pigment extender.

A process for converting gypsum to anhydrite in the presence of a seed material and the precipitation of anhydrite particles from weak acid solutions in the presence of a seed material is disclosed in U. S. Patent 2,006,342. The process of this issued patent is a coinvention of myself and others and the present invention is an improvement over said patented process. In the above mentioned patent we disclosed a method of converting gypsum in the presence of minor amounts of an anhydrite seed material. The seeds are finely divided anhydrite and effective in converting small amounts of gypsum to anhydrite. The anhydrite prepared as a result of this process is suitable for a pigment extender and for other purposes which require a fine powder but lacks the desired effectiveness of a seed for the conversion of more gypsum.

This invention has as an object a more economical process for the preparation of anhydrite calcium sulfate of pigment extender quality and extremely small particle size. A further object is to permit the use of less virgin acid in the preparation of anhydrite extender. A still further object is the utilization of a greater amount of by-product gypsum in the preparation of the anhydrite. Additional objects will become apparent from an examination of the following description and claims.

Broadly this invention comprises neutralizing sulfuric acid of approximately 60° Baumé strength with calcium oxide, calcium hydroxide, or calcium carbonate, while maintaining its strength in excess of 65%. Gypsum is then added to this suspension while maintaining the concentration of the latter above about 25% and then elevating the temperature. During this operation the added gypsum is transformed into an effective seed material. More gypsum is then added to this anhydrite suspension after which digestion is carried out at an elevated temperature. The anhydrite is then filtered and washed and the final product is a finely divided anhydrite of pigment fineness which is very useful especially for the manufacture of calcium sulfate containing pigments.

In a more restricted sense this invention comprises adding about 10 parts of slaked lime to 250 parts of sulfuric acid of approximately 60° Baumé strength and maintaining a temperature below about 35° C. during said addition. In this manner the primary seed of colloidal fineness is produced. The suspension thus formed is then mixed with gypsum, preferably by adding the latter to the former in an amount equivalent to about one-fourth that of the total to be converted. The suspension is then heated to above 60° C. and held at or above this temperature until it has been transformed into a finely divided calcium sulfate of the anhydrite modification. More gypsum is then added and this is likewise converted to anhydrite at the elevated temperature. It is obvious that heat must be applied in order to maintain the desired temperatures during the addition of the gypsum. After digestion the anhydrite is filtered, washed, and dried.

The preferred embodiment of this invention comprises adding about 10 parts of dry hydrated lime to 250 parts of sulfuric acid of approximately 60° Baumé strength and maintaining a temperature below about 35° C. during said addition. The suspension thus formed is then mixed with a gypsum press cake, preferably by slowly and continuously adding the latter to the former in an amount equivalent to about one-fourth that of the total to be converted. The suspension is then heated to the vicinity of 100° C. and held at this temperature until it has been transformed into a finely divided calcium sulfate of the anhydrite modification. The remaining gypsum cake is then added and digestion is carried on for about an hour at a temperature between about 95° C. and about 100° C. after which I find by analysis that the material is substantially transformed into a finely divided form of insoluble anhydrite. The final product is then filtered, washed to remove the small amount of acid and soluble impurities present, and dried at a temperature in the vicinity of 105° C.

The amount of primary seed material (that prepared from lime and acid) may be as small as one per cent of the calcium sulfate to be converted. I prefer, however, to use about 1.5% which is a substantial reduction from the prior art process. Amounts up to 4% are usable although it is not necessary and it is more economical to use lesser amounts.

My process lends itself to the economical production of anhydrite extended for calcium sulfate extended titanium pigments. In producing the latter large volumes of waste sulfuric acid from the hydrolysis of titanium sulfate containing solutions are available. The impurities present in this acid render it unfit for the hot precipitation of calcium sulfate. It is useful in the precipitation of gypsum in the cold by the addition of milk of lime. The gypsum so prepared is washed to remove the ferrous sulfate and other impurities and the washed press cake is then useful in my process. It may contain as much as 50% water.

Upon the addition of the gypsum press cake to the sulfuric acid primary seed suspension, the acid is diluted by the water of the press cake and I prefer to add about one-fourth of the gypsum for the preparation of the secondary seed material. This causes a reduction of the acid strength of the liquid phase to about 25% $H_2SO_4$ and I have found it best to maintain the concentration at or above this point during this operation. I find that the effectiveness of the secondary seed is sacrificed if too much of the gypsum is added at this time or if the acid concentration drops below 25%. I further find that the best results are obtained by a slow addition of the press cake gypsum to the acid and the addition of the calcium sulfate, which converts to secondary seeds, in from 15 to 30 minutes gives better results than if it is more rapidly added although my process gives satisfactory results with the latter method of operation.

The calcium sulfate during the digestion is suspended in a dilute solution of sulfuric acid and it is obvious that the acid becomes weaker during the addition of the gypsum press cake. The volume of acid initially employed should be great enough so that a final acid concentration of about 1% (10 grams $H_2SO_4$ per liter) or higher will result.

The concentration of the slurry during the digestion should be as thick as can be conveniently handled in agitated tank equipment. The water is supplied largely by the moisture of the press cake and if this is not great enough, water or dilute acid such as can be obtained from a previous batch is added to maintain a thickened consistency.

In the formation of the primary seed material, I have found it desirable to maintain the temperature below about 35° C. although a temperature of as high as 40° C. can be tolerated without a substantial reduction in the effectiveness of the seeds. The preferred lime material is dry hydrated lime but finely divided calcium carbonate can also be used. Either of these is to be recommended over unslaked lime due to the great amount of heat evolved upon its addition to the acid. The latter can be used, however, by observing the proper precautions.

This invention may be more readily understood from a consideration of the following examples which are given for illustrative purposes and are not intended to place restrictions of any kind on the herein described invention.

*Example I*

8.5 grams of pulverized hydrated lime was added over a period of 5 minutes to 207 grams of 78% sulfuric acid at a temperature of 20° C. after which the temperature rose to 35° C. 600 grams of gypsum press cake containing 300 grams of gypsum and 300 grams of free moisture was then slowly and continuously added to the colloidal seed of $CaSO_4$ thus formed. Heat was then applied and the temperature raised to between 90–100° C. as rapidly as possible. The temperature was maintained at this level during the addition of more of the gypsum press cake. 1900 grams of the gypsum cake was introduced in the second addition. The total length of time required to add the gypsum in this particular case was 2 hours. The material was digested at a temperature between 95–100° C. for one hour after which it was examined and found to be substantially converted to insoluble anhydrite of extremely fine particle size. The slurry ratio was adjusted and maintained at about 3–1 during the digest. The final product was filtered, washed to remove the small amount of acid and soluble impurities present, and dried at 105° C.

The gypsum used in the above example was made by reacting 8140 grams of milk of lime (5% CaO) with 3955 cc. of waste acid containing 791 grams of sulfuric acid (200 g/L). The above quantity of lime being sufficient to neutralize about 90% of the total acid present. The resulting gypsum was filtered and thoroughly washed to remove acid soluble impurities present in the acid. By analysis the washed press cake was found to contain 60% free and combined moisture and 40% solids.

*Example II*

200 pounds of commercially hydrated lime was added over a period of 30 minutes to 4950 pounds of 78% sulfuric acid at a temperature of 22° C. during which time the temperature rose to 40° C. Approximately 8 tons of gypsum press cake containing a free and combined moisture content of 63% was slowly and continuously added to the colloidal calcium sulfate thus formed. The temperature was raised to between 90–100° C. by means of live steam and maintained within said limits during the addition of more of the remaining gypsum cake. At this time, a total of 31.5 tons of the press cake had been added. Approximately 4 hours were required to add the 31.5 tons of gypsum press cake to the colloidal calcium sulfate made from the hydrated lime. The material was digested at a temperature between 95°–100° C. for an additional hour and on examination found to be substantially converted to insoluble anhydrite of fine particle size. The product was then filtered and washed on an Oliver filter, repulped, blended with 30% $TiO_2$ and calcined.

The 31.5 tons of gypsum press cake used in the above example was made by striking 64,000 pounds of milk of lime (15% CaO) into 9500 gallons of waste acid (255 g/L) containing approximately 18,800 pounds of sulfuric, the quantity of lime calculated to neutralize about 90% of the free sulfuric acid present. On completion of the above reaction the gypsum was filtered and washed nearly acid free on an Oliver filter, repulped and refiltered on a plate and frame press to a free and combined moisture content of about 63%.

It is to be understood that the described embodiments of this invention may be subjected to variation and modification without departing from the scope thereof.

For example, although it is preferred to use 60° sulfuric acid having a specific gravity of 1.71, it is to be understood that sulfuric acid having a specific gravity between about 1.61 and about 1.79 is suitable in my process.

Also, while my process is especially suited to the conversion of a gypsum obtained by neutralization of waste sulfuric acid by lime, it also gives an excellent product when the by-product gypsum from phosphoric acid manufacture or a finely ground natural gypsum is substituted therefor. In the event that a dry calcium sulfate is used as a raw material, water can be added along with the gypsum to maintain a flowing consistency. Otherwise the process is carried out as described above.

In this specification, I have disclosed a process which consumes much less virgin acid than the prior art processes by improvement of the character of the primary seeds by causing their formation in a stronger acid medium and then using these to prepare an effective secondary seed material from gypsum in the presence of sulfuric acid of 25% strength or stronger. This mode of operation makes it unnecessary to use virgin acid in large amounts for the preparation of seed material. The saving is evident when the almost valueless waste acid is substituted for virgin acid.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for producing finely divided insoluble anhydrite which comprises adding a member selected from the class consisting of calcium oxide, calcium hydroxide, and calcium carbonate to sulfuric acid having a specific gravity between 1.61 and 1.79 while maintaining a temperature not in excess of 40° C., the amount of said calcium compound added being equivalent to between 1 and 4 parts of anhydrite for each 100 parts of anhydrite to be produced and the acid concentration being maintained in excess of 65%, based on the total liquid composition, adding to the resulting primary seed material a gypsum-water mixture, the amount of said gypsum-water mixture added being less than that required to dilute the acid concentration below 25%, based on the total liquid composition, digesting the combined mixture at an elevated temperature until the gypsum has been substantially converted to insoluble anhydrite, thereafter adding additional gypsum-water mixture in such an amount that the final acid concentration will be at least 1%, based on the total liquid composition, digesting at an elevated temperature to produce insoluble anhydrite and thereafter separating.

2. A process for producing finely divided insoluble anhydrite which comprises adding a member selected from the class consisting of calcium oxide, calcium hydroxide, and calcium carbonate to sulfuric acid of approximately 60° Bé. strength while maintaining a temperature not in excess of 35° C., the amount of said calcium compound added being equivalent to between 1 and 4 parts of anhydrite for each 100 parts of anhydrite to be produced and the acid concentration being maintained in excess of 65%, based on the total liquid composition, adding to the resulting primary seed material a gypsum-water mixture, the amount of said gypsum-water mixture added being less than that required to dilute the acid concentration below 25%, based on the total liquid composition, heating the suspension to a temperature above 60° C. and holding it above said temperature until the gypsum has been substantially converted to insoluble anhydrite, thereafter adding additional gypsum-water mixture in such an amount that the final acid concentration will be at least 1%, based on the total liquid composition, digesting for about an hour at a temperature between about 95° C. and 100° C. and thereafter separating the insoluble anhydrite produced.

3. A process for producing finely divided insoluble anhydrite which comprises adding a member selected from the class consisting of calcium oxide, calcium hydroxide, and calcium carbonate to sulfuric acid having a specific gravity between about 1.61 and about 1.79 while maintaining a temperature not in excess of 40° C., the amount of said calcium compound added being equivalent to between 1 and 4 parts of anhydrite for each 100 parts of anhydrite to be produced and the acid concentration being maintained in excess of 65%, based on the total liquid composition, adding to the resulting primary seed material a gypsum-water mixture in an amount equivalent to about one-fourth that of the total to be converted, digesting the combined mixture at an elevated temperature until the gypsum has been substantially converted to insoluble anhydrite, thereafter adding the remaining three-fourths of the gypsum-water mixture, digesting at an elevated temperature to produce insoluble anhydrite and thereafter separating.

4. A process for producing finely divided insoluble anhydrite which comprises adding a member selected from the class consisting of calcium oxide, calcium hydroxide, and calcium carbonate to sulfuric acid of approximately 60° Bé. strength while maintaining a temperature not in excess of 35° C., the amount of said calcium compound added being equivalent to between 1 and 4 parts of anhydrite for each 100 parts of anhydrite to be produced and the acid concentration being maintained in excess of 65%, based on the total liquid composition, adding to the resulting primary seed material a gypsum-water mixture in an amount equivalent to about one-fourth that of the total to be converted, heating the suspension to a temperature above 60° C. and holding it above said temperature until the gypsum has been substantially converted to insoluble anhydrite, thereafter adding the remaining three-fourths of the gypsum-water mixture, digesting for about an hour at a temperature between about 95° C. and about 100° C., and thereafter separating the insoluble anhydrite produced.

5. A process for producing finely divided insoluble anhydrite which comprises adding a member selected from the class consisting of calcium oxide, calcium hydroxide, and calcium carbonate to sulfuric acid of approximately 60° Bé. strength while maintaining a temperature not in excess of 35° C., the amount of said calcium compound added being equivalent to between 1 and 4 parts of anhydrite for each 100 parts of anhydrite to be produced and the acid concentration being maintained in excess of 65%, based on the total liquid composition, adding to the resulting primary seed material a gypsum-water mixture in an amount equivalent to about one-fourth that of the total to be converted, heating the suspension to the vicinity of 100° C. and holding it at said temperature until the gypsum has been substantially converted to insoluble anhydrite, thereafter adding the remaining three-fourths of the gypsum-water mixture, digesting for an hour at a temperature between about 95° C. and about 100° C. and thereafter filtering, washing, and drying, the insoluble anhydrite produced.

6. A process for producing finely divided insoluble anhydrite which comprises adding dry hydrated lime to sulfuric acid of approximately 60° Bé. strength while maintaining a temperature not in excess of 35° C., the amount of said hydrated lime added being equivalent to between 1 and 1.5 parts of anhydrite for each 100 parts of anhydrite to be produced and the acid concentration being maintained in excess of 65%, based on the total liquid composition, adding to the resulting primary seed material a gypsum-water mixture in an amount equivalent to about one-fourth that of the total to be converted, heating the suspension to the vicinity of 100° C. and holding it at said temperature until the gypsum has been substantially converted to insoluble anhydrite, thereafter adding the remaining three-fourths of the gypsum-water mixture, digesting for about an hour at a temperature between about 95° C. and about 100° C. and thereafter filtering, washing, and drying, the insoluble anhydrite produced.

ROY WILLIAM SULLIVAN.